June 16, 1953  C. D. BAUCOM  2,641,907
SELF-AID HIGH-PRESSURE METERING SYSTEM
Filed Aug. 31, 1950
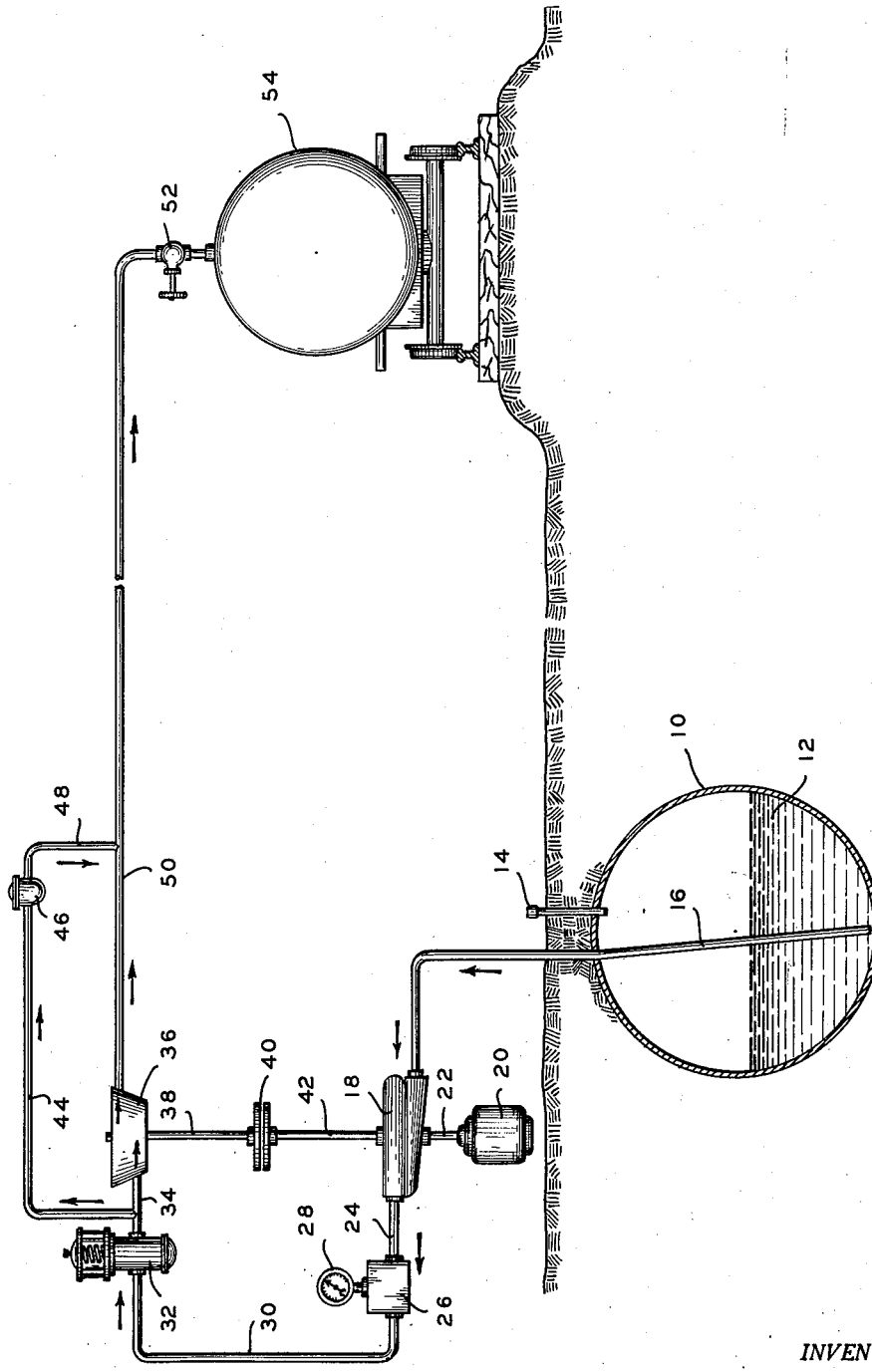
INVENTOR.
C. D. BAUCOM
BY
ATTORNEY Patented June 16, 1953

2,641,907

UNITED STATES PATENT OFFICE 2,641,907

SELF-AID HIGH-PRESSURE METERING SYSTEM

Carson D. Baucom, Raleigh, N. C.

Application August 31, 1950, Serial No. 182,577

5 Claims. (Cl. 62—1)

This invention relates to a self aid constant pressure metering system and more particularly to a method and system for dispensing fluids such as volatile liquids and liquified gases and metering such fluids at a pressure above the vapor pressure for the particular fluid under the prevailing temperature conditions with a minimum external power requirement during operation and the utilization of the available energy residing in the metered or measured liquid.

In the use of previous systems for dispensing and metering volatile liquids and liquified gases, such as anhydrous ammonia, butane, propane and the like, considerable difficulty has been encountered, since these gases are gaseous at normal atmospheric temperature and pressure but are liquifiable by application of additional pressure, and since either an increase in temperature or a decrease in pressure aid vaporization thus adding to the difficulty of the metering of measuring of such liquids.

Any vapor thus formed or expanded before the liquid reaches the meter will adversely affect the accuracy of the meter reading, since the meter will operate on either vapor or on liquid and when vapor is present the meter will give volume indications in excess of the actual volume of liquid dispensed.

Various systems have been devised to overcome this difficulty. In most of these systems a pump is utilized to dispense the liquid, and a back pressure valve is provided at a point in the system past the meter to maintain a relatively high pressure on the liquid during metering which pressure is somewhat higher than the maximum vapor pressure which is anticipated for the particular fluid under the prevailing climatic conditions.

However, with these systems pumping of the liquid at high pressure and friction during passage through the back pressure valve generate a considerable amount of heat which raises the final temperature of the fluid discharged and causes vaporization in the receiving tank or other container. Furthermore, the amount of power required to pump the liquid at high pressure is relatively large and the systems are therefore expensive to operate.

Some of these systems incorporate a differential pressure regulator which maintains the pressure on the meter at a constant amount over the vapor pressure in the storage tank or a pressure ratio regulator which maintains the pressure on the meter at a constant ratio to the vapor pressure in the storage tank. These expedients slightly reduce the pressure and external power required during periods of lower temperature, but are ineffective when the temperature is high and do not lower the discharge temperature of the liquid which will result in excessive vaporization in the receiving container such as a tank car or truck with a consequent reduction in the actual amount of liquid or pay load which can be carried.

One object of the present invention is to provide a constant pressure metering system which overcomes the disadvantages enumerated above and minimizes the heating of the fluid pumped and the external power requirement for pumping with a consequent substantial reduction in the overall cost of operation.

Another object of the present invention is the provision of a dispensing and metering system for volatile liquids which maintains a constant pressure through the meter above the pressure of vaporization for the particular liquid and prevailing temperature conditions and utilizes the pressure drop between the metering pressure and discharge pressure to operate a fluid motor which provides a substantial amount of the power required for pumping by converting the potential energy of the liquid under pressure into kinetic energy.

The dispensing and metering system, as disclosed herein illustrating one preferred embodiment of the present invention, includes a motor driven pump which withdraws liquid from a storage receptacle, a meter through which the liquid is pumped at a relatively high pressure above the vapor pressure for the particular liquid and temperature conditions, a pressure regulating valve which maintains a constant pressure on the liquid passing through the meter, a fluid motor which is coupled through an overrunning clutch to the pump and receives liquid discharged from the pressure regulating valve, thus utilizing the liquid under pressure to supply a substantial amount of the power required for driving the pump, and a by-pass line around the fluid motor controlled by a pressure-reducing valve to discharge the excess fluid not utilized by the fluid motor which is of somewhat smaller capacity than the pump.

Further objects and advantages of the invention will be apparent from the following description taken in conjunction with the drawings, wherein the single figure is a diagrammatic elevation of a system illustrating one preferred embodiment of the present invention.

Referring now to the drawing in detail a storage receptacle 10 may be imbedded in the ground, as shown, where the temperature below the surface will be relatively low and the volatile fluid 12 stored therein will be kept as cool as possible, or the fluid 12 may be withdrawn from a tank car or truck, or an elevated tank such as those commonly used for bulk storage of gasoline, butane, propane and similar fluids.

A vent or fill pipe 14 extends from the upper portion of receptacle 10 to a point above the ground, and a conduit 16 extends from a point near the bottom of the receptacle 10 to a pump 18 which is directly driven by a motor 20 through a shaft 22. The motor 20 may be an electric, mechanical, hydraulic, air or any other type of prime mover depending on the kind of power available.

A conduit 24 extends from the pump 18 to a fluid flow meter 26 which may be provided with an indicating device 28 or any other registering or recording device which will indicate the quantity of fluid which the meter has measured.

A conduit 30 extends to a pressure regulating valve 32, and an inlet conduit 34 extends from valve 32 to a fluid motor 36. Motor 36 drives a shaft 38 which is connected through an overrunning clutch 40 to a shaft 42 on pump 18. Clutch 40 may be a mechanical overrunning clutch or a magnetic or hydraulic clutch could be utilized.

A by-pass line 44 extends around fluid motor 36 from conduit 34 through a pressure-reducing valve 46 and a conduit 48 which connects with the discharge conduit 50 extending from fluid motor 36.

Discharge conduit 50 may be connected through a control valve 52 to any suitable receiving container, such as the tank car 54 shown, a tank truck, a small bottle commonly used for propane and butane, or the system may be used to deliver the volatile liquid from a tank car or truck directly into the consumer's storage tank.

In the operation of the system illustrated the pressure regulating valve 32 is set to maintain a suitable constant in the system from pump 18 through the meter 26, which pressure will be above the pressure of vaporization for the particular fluid under the prevailing temperatures encountered in operation. This will prevent the liquid 12 from forming a vapor while passing through the meter 26 and will assure the most accurate reading consistent with the accuracy of the meter used.

Pressure-reducing valve 46 may be set for a slightly lower pressure than the pressure-regulating valve 32 and maintains a relatively high pressure on the inlet conduit 34 to fluid motor 36 as well as preventing a hydrostatic lock within the system. Motor 36 has a somewhat smaller capacity than the pump 18 so that normally there will always be an excess of liquid which will be by-passed through line 44 and valve 46. This excess should be reduced to a minimum to provide for the maximum advantage in power feed back from motor 36 to pump 18.

During operation of the system the control valve 52 will normally be opened and motor 20 started. However, if a by-pass is provided around or in pump 18, valve 52 may be left closed with the motor 20 and pump 18 operating. When fluid motor 36 picks up sufficient speed, the overrunning clutch 40 will engage and fluid motor 36 will drive pump 18, as well as motor 20, and furnish a substantial amount of the power required, thus minimizing the external power requirement from motor 20.

Since there is very little friction due to throttling in valve 32 and some heat is dissipated in fluid motor 36 due to the reduction in pressure of the liquid and the expending of energy therein, the liquid discharged from conduit 50 into tank car 54 will be at a lower temperature and reduced pressure.

If desired, a direct drive between fluid motor 36 and pump 18 may be used and with certain types of fluid motors the motor itself may provide sufficient back pressure on the meter to prevent vaporization, and the pressure-regulating valve 32 and/or the pressure-reducing valve 46 may not be required.

It will be obvious that the method and system of dispensing and metering volatile liquids and liquified gases, as disclosed herein, will have wide utility and may be readily modified to suit particular conditions of operation with various different fluids.

It will be obvious to those skilled in the art that various changes may be made in the invention without departing from the spirit and scope thereof and, therefore, the invention is not limited by that which is shown in the drawings and described in the specification, but only as indicated in the appended claims.

What is claimed is:

1. The method of dispensing and metering volatile liquid from a storage receptacle to a receiving container comprising pumping liquid from the storage receptacle through a meter at relatively high pressure above the vapor pressure of the liquid at prevailing temperatures, passing the liquid through a pressure regulating valve for maintaining the pressure through the meter, utilizing the liquid at high pressure to operate a fluid motor for minimizing the power requirement to pump the liquid, by-passing any excess of liquid around the fluid motor, and discharging the liquid from the fluid motor and the by-pass into the receiving container.

2. The method of dispensing and metering volatile liquid from a storage receptacle to a receiving container comprising pumping liquid from the storage receptacle through a meter at relatively high pressure above the vapor pressure of the liquid at prevailing temperatures, passing the liquid through a pressure regulating valve, utilizing the liquid at high pressure to operate a fluid motor for assisting in pumping the liquid, by-passing any excess of liquid around the fluid motor, and discharging the liquid from the fluid motor and the by-pass into the receiving container.

3. The method of dispensing and metering volatile liquid from a storage receptacle to a receiving container comprising pumping liquid from the storage receptacle through a meter at relatively high pressure above the vapor pressure of the liquid at prevailing temperatures, utilizing the liquid at high pressure to operate a fluid motor for assisting in pumping the liquid, by-passing any excess of liquid around the fluid motor, and discharging the liquid from the fluid motor and the by-pass into the receiving container.

4. A fluid pumping system for dispensing and metering a volatile fluid from a storage receptacle to a receiving container, comprising a pump having discharge and inlet openings in communication with the receptacle, a fluid flow meter, a pressure responsive valve, a fluid motor connected in series seriatim from the discharge to the container, a by-pass around said fluid motor, a pressure reducing valve in said by-pass, and means for driving said pump from said fluid motor.

5. Apparatus for dispensing and metering volatile fluid, comprising a pump, a fluid flow meter, a pressure reducing valve, a fluid motor connected in series seriatim, means for driving said pump from said fluid motor, said means comprising shaft means connected to said pump and motor and an overrunning clutch, said shaft means being connected through said clutch.

CARSON D. BAUCOM.

References Cited in the file of this patent

UNITED STATES PATENTS

| Number | Name | Date |
|---|---|---|
| Re. 19,054 | Heylandt | Jan. 16, 1934 |
| 2,049,239 | Wilcox | July 28, 1936 |
| 2,402,355 | Whaley, Jr. | June 18, 1946 |
| 2,467,413 | Wildhack | Apr. 19, 1949 |
| 2,487,863 | Garretson | Nov. 15, 1949 |